United States Patent [19]

Clark

[11] 4,266,498
[45] May 12, 1981

[54] ROPE SECURING DEVICE

[76] Inventor: James R. Clark, 36 Elsmere Blvd., Wilmington, Del. 19805

[21] Appl. No.: 914,239

[22] Filed: Jun. 9, 1978

[51] Int. Cl.³ .............................................. B63B 21/04
[52] U.S. Cl. ...................................... 114/218; 24/130
[58] Field of Search ............... 114/218, 223, 108, 102; 24/115 J, 115 K, 130

[56] References Cited

U.S. PATENT DOCUMENTS

| | | | |
|---|---|---|---|
| 3,334,914 | 8/1967 | Vierregger | 114/218 X |
| 3,574,900 | 4/1971 | Emery | 114/218 X |
| 3,897,163 | 7/1975 | Holmes | 24/130 X |

*Primary Examiner*—Sherman D. Basinger
*Attorney, Agent, or Firm*—Abramo & Abramo

[57] ABSTRACT

Rope securing device, or cleat, comprising a support having two upright sides in which two ends are inclined and the other ends have a recess designed to hold a rope. A support bar between the sides aids in holding the rope.

1 Claim, 2 Drawing Figures

ROPE SECURING DEVICE

FIELD OF THE INVENTION

This invention relates to a rope securing device and more particularly to a retaining cleat adapted for boats to secure a rope or line against slippage.

BACKGROUND OF THE INVENTION

The use of a cleat to hold a rope taunt, especially in sailing is well known. Such cleats retain sail ropes and hold the sails fast. During maneuvering of a boat, during tacking, jibbing or the like, it is necessary to quickly set and release these sail ropes. In sailboats holding one sailor, it is important that the boat is equipped with devices which allow a quick and easy release of the rope and also an easy method of fastening the sail ropes.

SUMMARY OF THE INVENTION

This invention provides such a device. Specifically, the device comprises:

(1) A flat support (or base),
(2) Two parallel substantially upright side members extending from said support;
 (a) the two ends of each side member at one end of the support being substantially identically gradually inclined with respect to the support in a direction toward the other end of the support with the degree of inclination changing to provide a convex appearance of the ends,
 (b) the other two ends of each side member each having a substantially identical wedge-shape cavity (recess) inclined toward said support,
(3) A support bar protruding from the inside wall of one side member and extending toward the inside wall of the other side member, said support bar constructed and arranged to guide a rope looped around said bar.

DESCRIPTION OF THE INVENTION

Figure 1:
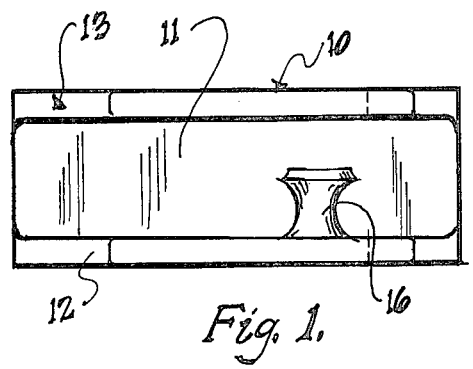
FIG. 1 is a top view of a device of this invention.
Figure 2:
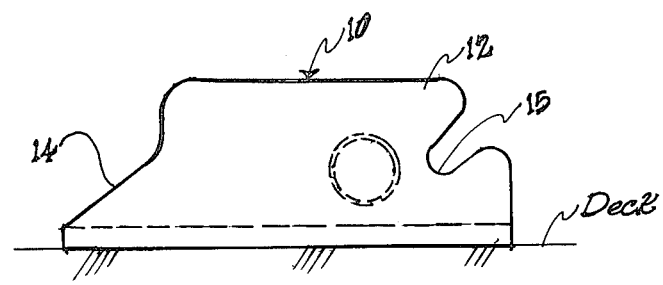
FIG. 2 is a side view of the device of FIG. 1.

The rope securing device of this invention employs shaped surfaces to retain a rope and provides a means to quickly and easily release the rope. The rope can be any type e.g. hawser, or twisted core, usually composed of cotton, hemp, sisal, or plastic such as nylon, polypropylene and the like. The term "rope" used herein includes all these.

Referring to FIGS. 1–4, the device 10 can be made, if desired, from a single (integral) piece of metal or plastic, such as a casting of malleable iron or brass, a molding of strengthened polyoxymethylene, polyamide or a polyester resin, a mixture of these metals and resins or the like. The device comprises a flat support 11 and sides 12 and 13. The support is preferably substantially rectangular but can be of any other desired shape so long as the two sides are generally upright and parallel with one another. The support is adapted to attach to a substrate surface such as boat rail or hull by means of fastening devices (not shown) such as screws or clamps or the like. However, the device can be used for other applications requiring a method of securing a rope.

The device is positioned, in practice, so that the two sides are substantially parallel with the linear direction of the rope to be held. The ends of the sides positioned away from the source of the rope (i.e. the rear of the device) are inclined with respect to the plane of the support. The inclination is in the general direction of the front of the device i.e. the portion nearest the source of the rope, and the degree of inclination changes along the end at 14 to provide a means to aid in holding a taunt rope. The degree of inclination is not critical, so long as the degree changes at some point (preferably between about one-half to two-thirds the way up the inclination) along the inclined end. For example, near the base of the side the degree of inclination may range from about 25 to 60 degrees measured from the plane of the support and after the change in inclination at point 14, may range from about 75 to 90 degrees from the plane of the support. After the change in degree, the inclination will be greater (measured from the plane of support) than before and will be great enough to ensure that a taunt rope will be held thereby.

The front ends of the sides each are provided with an identical wedge shaped cavity or recess 15 which extends in a general direction toward the center base of the support. Ordinarily, all edges of the device will be rounded to reduce friction on the rope.

Figure 3:
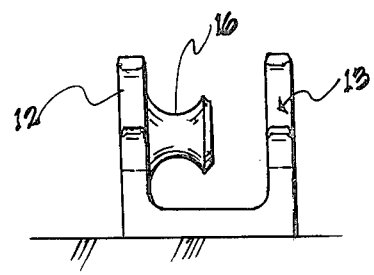
FIG. 3 is a view of the right end of the device shown in FIG. 2.
Figure 5:
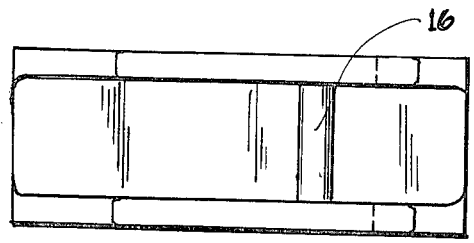
FIGS. 5, 6 and 7 each show alternate support bar devices for use in this invention.
Figure 6:
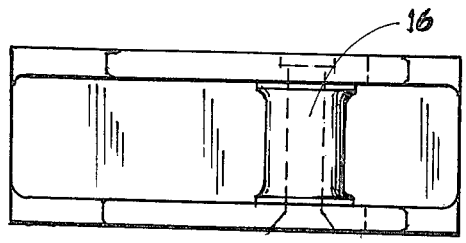
Figure 7:
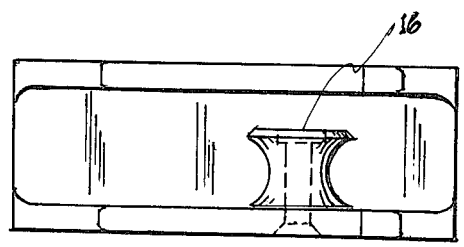

In addition, a support bar or lug 16 is attached or is integral with at least one interior wall of one side of the device. The bar extends at least part way toward the other interior wall and is constructed and arranged to guide a rope around the bar. Preferably, the cross-section of the bar is round. In FIGS. 5, 6 and 7, three different types of bars are depicted. Preferably, when the bar is viewed along its length, it has a concave shape as seen in FIGS. 1, 3, and 7. Preferably also, the bar will not extend to the other wall as shown in FIGS. 5 and 6, but will extend only part way (most preferably about or less than half way toward the other wall as shown in FIGS. 1, 3 and 7).

Figure 4:
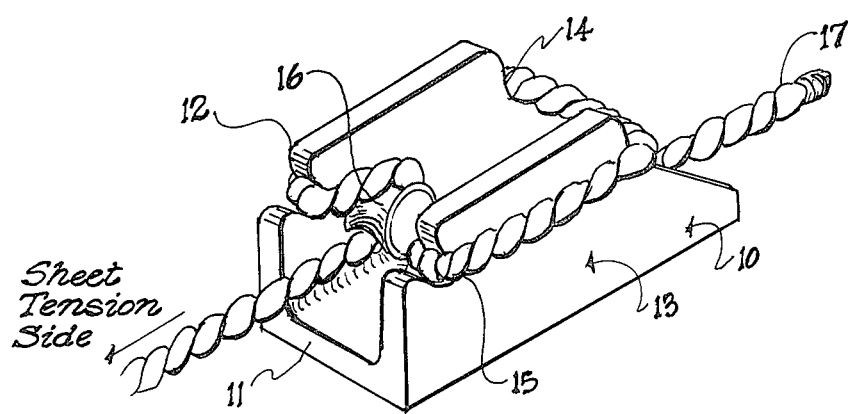
FIG. 4 is a perspective view of the device shown in FIGS. 1, 2 and 3.

In operation and referring to FIG. 4, to fasten a rope to the device, the rope is passed around bar 16, caught in recess 15 of side 12, passed around the outside of the device so that the rope catches at the change in inclination 14 of the rear of sides 12 and 13, caught in recess 15 of side 13 and passed out the rear of the device under the portion of the rope crossing points 14 to form a tail 17.

A primary advantage of this invention lies in the ease with which the rope is released. To release the rope, the tail 17 of the rope is pulled up over the top of the device. This motion forces the portion of the rope stretching between inclination change points 14 up over the top of the device and releases the entire rope from the device.

I claim:
1. A rope securing device comprising:
 (a) a flat support (or base),
 (b) two parallel substantially upright side members extending from said support;
  (i) the two ends of each side member at one end of the support being substantially identically inclined with respect to the support in a direction gradually toward the other end of the support with the degree of inclination changing to provide a convex appearance of the ends,

(ii) the other two ends of each side member each having a substantially identical wedge-shaped cavity (recess) inclined toward said support; and (c) a support bar protruding from the inside wall of one side member and extending toward the inside wall of the other side member, said support bar constructed and arranged to guide a rope looped around said bar and wherein the support bar is a lug extending from the inside wall of one side member toward the other side member, the sides of said lug being concave and said lug extending not over one half the distance between the two side members.

* * * * *